United States Patent [19]

Meunier et al.

[11] 4,252,515

[45] Feb. 24, 1981

[54] APPARATUS FOR THE CONTINUOUS FABRICATION OF CELLULAR PRODUCTS OF A THERMOSETTING RESIN

[75] Inventors: Jean P. Meunier; Marie P. Barthe, both of Clermont de l'Oise; Serge Have; Bernard Frumen, both of Nogent sur Oise, all of France

[73] Assignee: Saint-Gobain Industries, Neuilly-sur-Seine, France

[21] Appl. No.: 945,066

[22] Filed: Sep. 22, 1978

Related U.S. Application Data

[62] Division of Ser. No. 795,914, May 11, 1977, abandoned.

[30] Foreign Application Priority Data

May 12, 1976 [FR] France .................................. 76 14330

[51] Int. Cl.³ ............................................. B29D 27/04
[52] U.S. Cl. ..................................... 425/224; 264/39; 264/45.5; 264/53; 264/338; 264/DIG. 2; 425/231; 425/329; 425/817 C
[58] Field of Search .................. 425/4 C, 817 C, 231, 425/329, 224; 264/DIG. 2, 45.8, 46.2, 46.3, 39, 45.5, 338, 53

[56] References Cited

U.S. PATENT DOCUMENTS

| | | | |
|---|---|---|---|
| 2,549,864 | 4/1951 | Toulmin | 264/46.2 X |
| 2,866,730 | 12/1958 | Potchen et al. | 264/46.2 X |
| 2,929,793 | 3/1960 | Hirsh | 425/817 C X |
| 3,147,164 | 9/1964 | Adams | 264/46.2 X |
| 3,215,581 | 11/1965 | Carlson et al. | 425/4 C X |
| 3,761,209 | 9/1973 | Hanton | 425/4 C |
| 3,821,337 | 6/1974 | Bunclark et al. | 264/DIG. 2 |
| 3,885,010 | 5/1975 | Bruning et al. | 264/DIG. 2 |
| 4,026,980 | 5/1977 | Hubbard | 264/DIG. 2 |

FOREIGN PATENT DOCUMENTS

| | | | |
|---|---|---|---|
| 51-79156 | 9/1976 | Japan | 425/817 C |
| 1016719 | 1/1966 | United Kingdom | 264/46.2 |

*Primary Examiner*—Philip Anderson
*Attorney, Agent, or Firm*—John T. Synnestvedt; John S. Child, Jr.

[57] ABSTRACT

A method for the continuous fabrication of blankets or sheets of expanded phenolic resin displaying a hard skin on each of their sides, according to which a mixture, comprising in particular a resole resin, a blowing agent and a hardening catalyst is placed on an essentially flat surface of a moving conveyor, is completely expanded, and is conformed eventually between two parallel surfaces entrained in the same direction, the second surface being located above and substantially parallel to and able to move at the same speed as the moving surface, characterized in that, in a first stage, after having been distributed at the surrounding temperature and in the liquid state along the whole width of the surface of the transport component, in such a way so as to comprise a blanket of expandable liquid mixture essentially uniform in thickness, the expandable mixture is conveyed in the open air towards the conformation surfaces while being submitted to a heating so that it expands, the degree of heating and the length of the path in the open air being chosen in a way that the upper skin loses its stickiness before the complete expansion of the mixture and that after the complete expansion, the obtained expanded mass reaches an immediate hardening state, the upper skin remaining supple and unsticky; and then the expanded mass is formed by the exertion of pressure on its free side at the time of entry between the conformation surfaces, thus reducing the thickness of the mass to its definitive value; and finally the hardening of the resin is completed by maintaining the pressure and the heat during the passage between the conformation surfaces.

26 Claims, 2 Drawing Figures

APPARATUS FOR THE CONTINUOUS FABRICATION OF CELLULAR PRODUCTS OF A THERMOSETTING RESIN

This is a divisional of application Ser. No. 795,914, filed May 11, 1977 now abandoned.

FIELD OF THE INVENTION

The invention relates to an improved apparatus for carrying out a process for the continuous fabrication of blankets or sheets of phenolic resin mixture. A former process over which the invention is an improvement is shown in the U.S. Pat. No. 3,761,209.

BACKGROUND OF THE INVENTION

The former method and apparatus allowed the production of panels of phenolic foam displaying surface skins. That is the panels possessed smooth surfaces on the four main sides; and, in addition, on their upper principal face, they possessed a layer of cellular material of increased density. These skins, and particularly a skin of uniform thickness on the upper fabrication side, are advantageous in four respects. They increase by a considerable effect the resistance to abrasion; they increase the force required to rupture by bending substantially and also the maximum force required to puncture; they, finally, decrease the permeability to water vapor. The skin located on the upper side of the panels has an irregular thickness and displays, after fabrication, wavy surfaces and zones of partial tearing.

Thus the upper side of the panels displays a generally unaesthetic aspect, and its irregularity prevents obtaining any possible improvement of the resistance to abrasion, of the force required to rupture by bending, of the maximum force required to puncture exerted perpendicular to the panel, and of the permeability to water vapor. In addition, the lateral sides of the fabricated panels with the help of the apparatus described in U.S. Pat. No. 3,761,209 are irregular and in order to obtain flat and square surfaces with relation to the main sides, the borders must be cut with a saw. There results on the two lateral surfaces a complete absence of skins with the subsequent inconveniences. And finally, the apparatus described in this former patent does not allow rapidly varying the thickness of fabrication, this variation necessitating in fact the unmounting and the remounting of side pieces fixed on the edges of the lower conveyor belt with the two belts fixing the thickness of the product obtained.

SUMMARY AND OBJECTS

In order to remedy these inconveniences, the present invention relates to apparatus for carrying out a method for the continuous fabrication of blankets or sheets of expanded phenolic resin displaying a skin on each of their sides, according to which an expandable liquid mixture, comprising particularly a resin, a blowing agent and a hardening catalyst, is placed on the essentially flat surface of a moving conveyor, is completely expanded, and is conformed eventually between two parallel surfaces entrained in the same direction, the second surface being located above and substantially parallel to and able to move at the same speed as the moving surface, characterized in that, in a first stage, after having been distributed at the surrounding temperature and in the liquid state along the whole width of the surface of the transport component, in such a way so as to comprise a blanket of expandable liquid mixture essentially uniform in thickness, the expandable mixture is conveyed in the open air towards the conformation surfaces while being submitted to a heating so that it expands, the degree of heating and the length of the path in the open air being chosen in a way that the upper skin loses its stickiness before the complete expansion of the mixture and that after the complete expansion, the obtained expanded mass reaches an immediate hardening state, the upper skin remaining supple and unsticky; and then the expanded mass is formed by the exertion of pressure on its free side at the time of entry between the conformation surfaces, thus reducing the thickness of the mass to its definitive value; and finally the hardening of the resin is completed by maintaining the pressure and the heat during the passage between the conformation surfaces.

The invention concerns, likewise, an apparatus for the use of the method comprising a lower flat moving surface and a second surface parallel to the moving surface with the exception of, at the start, where the surfaces converge rapidly before becoming equidistant. Heat means for heating certain zones of the moving surface, and a movable mixing gun are provided, characterized in that, on the moving surface, there is distinguished a primary unheated zone, a second heated zone downstream of the first and a third heated zone downstream of the second. The moving surface in this third zone collaborates with the second surface along its length. This third zone is characterized in that it comprises, besides conformation means, in particular, heated lateral endless conveyors whose surfaces are vertical, which will henceforth be referred to as "side belts" placed at the two sides of the moving surface along a length which joins with the first and second zones and forming with the moving surface a tight contact with the expandable mixture, complementary lateral conformation means being located at the entrance of the conformation zone in alignment with the lateral or side belts.

DESCRIPTION OF THE DRAWINGS

The attached drawings schematically show, as a means of example, a preferred form of embodiment of the apparatus.

In these drawings.

DETAILED DESCRIPTION

Figure 1:
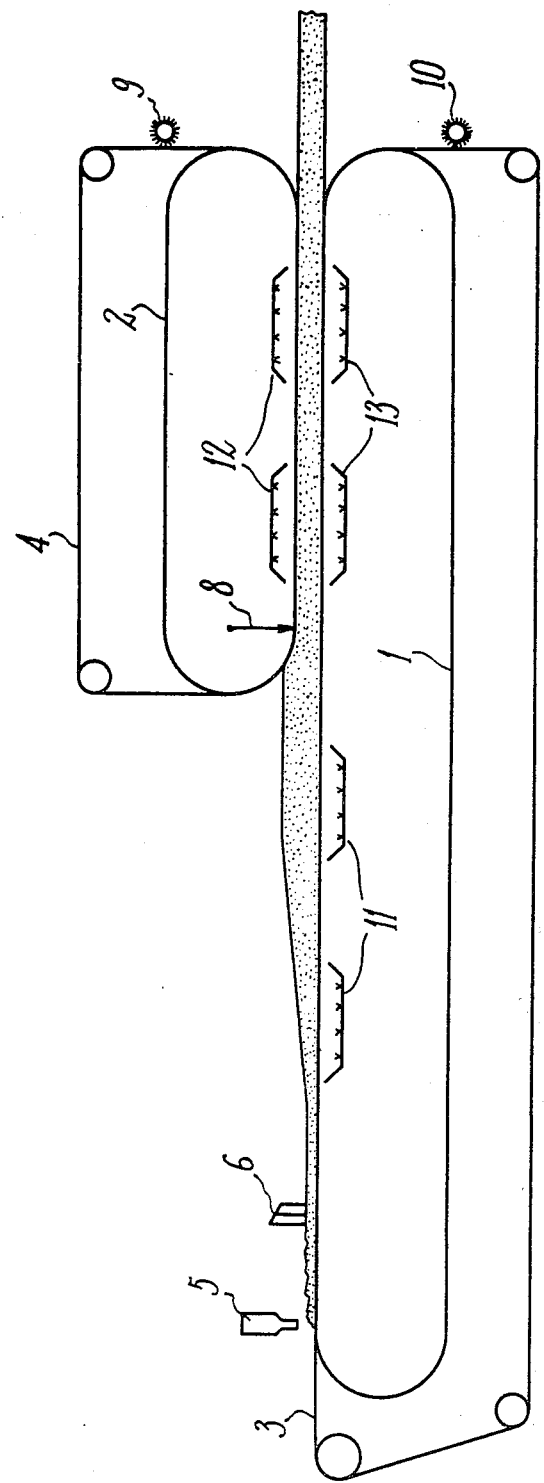
FIG. 1 illustrates the apparatus in longitudinal cross-section charged with the expanded mass.

It has been found that the regular formation, without waves or partial tears, of an upper skin of constant thickness, necessitates, in a first stage, the mixture, in the course of expansion and hardening, reaching an essentially uniform thickness; and reaching a precise hardness state before being conformed, in a second stage, by the second surface to the final desired thickness. The moving surface and conformation or second surface can advantageously be comprised of two endless belts.

These two conditions; uniform thickness and precise hardening state of the expanded mass, attained at the time of the conformation by the second surface, are embodied in the following manner:

The expandable mixture flows first of all at a temperature below 23° C. on the moving surface in an unheated zone upstream of the path where this moving surface is heated, this unheated zone being long enough so that the expandable liquid mixture has the time to form a blanket of an essentially uniform thickness in the said zone. Then the blanket mixture is carried at increasing temperatures in the advancing direction of the moving surface in order for it to expand in a second zone of the path traversed by the moving surface. The maximum temperature reached by the mixture before it is covered with the second surface is between 30° C. and 60° C., this value varying as a function of the thickness and of the desired density of the blankets or sheets.

In the course of the passage into this second zone, the skin of the outer surface of the upper side of the expanded mixture loses its stickiness before the mixture terminates its expansion. After the end of the expansion, the expanded sheet of phenolic resin mixture must have time for it to reach an intermediary hardening state before its entry between the moving surface and the second surface to take its definitive form.

The duration of time after the disappearance of the stickiness and before the entry of the expanded mass between the moving surface and the second surface is from 3 to 6 minutes, preferably 4 to 5 minutes in the case where the expanded sheet of phenolic resin mixture has a temperature of around 60° C.

The stickiness condition of the outer surface skin is defined by its feel to the touch of a dry finger. The "unsticky" phase begins from the place where the surface of the expanded sheet of phenolic resin mixture remains deformable under the finger, but no longer adheres. But if the skin of the expanded mixture is lifted, the material just below still adheres to the finger.

The start of this unsticky stage which is characteristic of a given formulation of expanded mixture corresponds, therefore, in effect, to a certain intermediate degree of hardening of the outer surface in the air, the heart of the foam remaining relatively fluid-like.

The indicated duration of from 3 to 6 minutes having elapsed after the end of the stickiness condition, the expanded phenolic resin mixture then presents a new hardening state which is more advanced, characterized by a considerable hardening of the center of the expanded mixture, which is thus more pronounced at this stage than that of the surface of the expanded mixture, as well as by a state of good flexibility of the outer surface skin which adheres neither to the finger nor to the moving surface nor to the side belts. This is probably due to the fact that the hardening reaction being exothermic progresses more rapidly at the center of the expanded mixture which does not exchange calories with the exterior as the surface of the expanded mixture does.

At this time the expansion of the mixture has already reached its maximum, that is the thickness of the expanded mixture on the moving surface is maximum and constant after from 1 to 3 minutes.

Care must be taken to provide the apparatus with a sufficient length along the moving surface, before coverage with the second surface, for all the various fabrication conditions. From now on, products of varied densities and thicknesses can be fabricated by adequately altering the following factors:

formulation of the expandable liquid phenolic resin mixture, particularly the content of the blowing agent;

discharge from the gun;

distance from the gun to the forward edge of the second surface;

length of the unheated zone of the moving surface on which the distribution of the expandable liquid mixture takes place;

length of the heated zone of the moving surface where the expansion of the expandable liquid takes place before coverage with the second surface;

heating temperature of this second zone;

speed of the second surface and moving surface and of the side belts;

spacing between the second surface and moving surface.

The usable expandable liquid mixtures in the apparatus according to the method of the present invention essentially comprise a phenolic resin of resole type, pentanes as the volatile blowing agent and an acidic hardening catalyst. Added to this acid initially is a certain quantity of methanol, then a solvent of the resin and of the acid. A more regular and finer cell structure is obtained with better final product properties by adding a surface active agent.

These mixtures must have a well defined reactivity, that is to say the speed of the exothermic hardening. Consequently, their rapidity of expansion must range between certain limits. The quality of the cell structure depends in effect on the equilibrium between this speed of expansion and of hardening. In addition, the state of hardening at the center of the expanded mixture and of flexibility of the surface skin, necessary at the time of conformation in order to obtain a surface skin which is regular and resistant on the outer side of the expanded mixture, depends obviously on the reactivity of the expandable mixture.

This reactivity is a function of three factors, that is the actual reactivity of the phenolic resin which is used, the quantity, and the nature of the acid hardening catalyst present in the expandable mixture.

The usable resins in the present invention will be, preferably, those defined in French Pat. No. 2,147,766 filed Apr. 15, 1971 or by the French Patent filed Apr. 30, 1975 under the number 75 135 70. This type of resin presents, in addition, as stated in French Pat. No. 2,147,766, the advantage of making the sheets of expanded and hardened phenolic resin self-extinguishable according to ASTM D 635-68 without any addition of substances retarding combustion.

The expanded liquid phenolic resin mixtures used in the method and with the apparatus of the present invention comprise, as a hardening agent, an aqueous solution of 31% by weight hydrochloric acid, the aqueous solution being present in amounts of between 3 and 8 g and preferably between 4 and 6 g relative to 100 g of resin. The methanol is added to this acid by 0.5 to 2 g per 100 g of resin.

The surface-active agents which are introduced likewise into the expandable liquid mixtures have the purpose, primarily, of decreasing the mean size of the cells of expanded phenolic resin mixture while causing them to be of a very regular size. This is what is meant by saying that the cell structure of the expanded phenolic resin mixture is very fine and very homogenous, having a substantial and favorable influence on the mechanical properties; and secondly, allowing the incorporation of blowing agents such as the pentanes into the resin without losing these pentanes, which permits adding them at will and thus preparing sheets of expanded and hardened phenolic resin of defined density.

It is convenient to recall that the pentanes are aliphatic hydrocarbons and are at the same time volatile and insoluble in water. In order to use them as blowing agents, they must be emulsified at a temperature of around 15° C. in the resin which is itself an aqueous solution of resole in which the pentanes are consequently insoluble. This dispersion is done by mixing the resin while adding the pentanes little by little. If this is done, without adding a surface-active agent to the resin at the beginning, the loss of pentanes is very substantial. On the other hand, by first adding certain surface-active agents to the resin and then proceeding with the addition of the pentanes by agitation, practically no loss of the pentanes with these surface-active agents, is noted during their use in the resin emulsion.

The surface-active agents particularly interesting in this regard are: the copolymers of siloxane and alkylene oxide (for example, the L 5320 products from Union Carbide or the DC 193 products from Dow Corning) the aliphatic monoesters of polyoxyethylene sorbitan (for example, certain products from the Tween series, such as Tweens 20 from Atlas Chemical) or polyoxyethylene glycerides (for example, the G 1292 product Altas Chemical).

For the fabrication of blankets or sheets according to the present invention, apparatus is used which is different from that of U.S. Pat. No. 3,761,209 already cited, in that it contains the upstream portion of the moving surface, zones not covered with the second or conforming surface comprising successively an unheated zone and a heated zone. It is in this heated zone that the expansion of the blanket of expandable phenolic resin mixture takes place—the partial hardening and the bilateral conformation of this blanket and the conformation to the thickness and the final hardening being carried out after passage through this zone and during the passage of the blanket of expanded mixture between the moving surface and the second surface.

The distribution gun, known from the patent cited hereabove, is animated by a to-and-fro transfersal movement with relation to the advancing direction of the moving surface and places the expandable liquid phenolic resin mixture in practically transverse ribbons with relation to the advancing direction. As a consequence of the viscosity of the mixture, and particularly when the discharge of the mixture is weak, that is when blankets or sheets are fabricated which are not very thick, these ribbons are relatively spaced from each other, and for a certain time are spread out to finally reunite into a continuous blanket of expandable liquid mixture on the moving surface.

According to one embodiment of the invention, there is provided a distribution comb which is placed at a slight distance from and downstream from the gun, its teeth descending vertically into the mixture for a short distance from the moving surface. Its role is to reunite the ribbons of expandable liquid mixture, initially separated, into a continuous blanket of homogenous thickness before the conformation of the fully expanded phenolic resin mixture to its thickness.

This compression, which takes place after the complete expansion and a sufficient hardening of the blanket of phenolic resin mixture, is achieved by exerting a very light pressure on the outer surface of the skin of the upper side of the expanded mixture. So that the outer surface skin is in good condition, that is, dense enough without being too thick, this process of compression must reduce the thickness of the fully expanded phenolic resin mixture from approximately 0.5 mm to 2 mm, depending upon the fabricated thickness. The conformation at the outer skin is all the more effective if the hardening of the center of the expanded phenolic resin mixture has become sufficiently advanced as stated, above. The force exerted by the second surface must not be too sudden and, so that the compression is sufficiently progressive, an initial drum is provided on the second surface having a radius between 250 and 500 mm.

The product thus conformed to its definitive thickness is then moved between the parallel second and moving surfaces, advancing at the same speed and maintained at a heated temperature between 50° C. and 70° C., so as to finally complete the hardening.

In addition, it has been found that by using the phenolic resins and foam cream formulations described in the French Pat. Nos. 2,147,766 and 75 135 70, the drying necessary after the fabrication of the panels is done most favorably by air at a temperature between 110° C. and 120° C. and preferably close to 115° C.

These temperatures are in fact those which give the best values to the compression resistance, to the force required to rupture by bending, and the maximum force required to puncture.

The necessary durations for drying in this range of temperatures are a function of the density and especially of the thickness of the products.

According to one characteristic of the present invention, the shaping of both sides of the expanded phenolic resin mixture is assured in the distribution and expansion zones before the coverage with the second surface. This shaping is carried out with the help of continuous side belts with polytetrafluoroethylene surfaces, advancing at the speed of the moving surface and carried out of the same increasing temperatures as this moving surface. A sufficient height is given to the side belts in order for them to be able to fabricate panels of a maximum desired thickness which is around 300 mm, minimum thickness being around 25 mm.

The side belts are driven by one of the two polytetrafluoroethylene drums of a diameter of 200 to 400 mm, the drums turning freely around their vertical axes, these axes being practically situated in the vertical plane passing through the horizontal axis of the forward drum of the second surface.

The spacing of the surfaces of the two drums in contact with the expanded phenolic resin mixture is regulated at a slightly smaller distance than that of the spacing of the side belts, so that sheets are obtained at the exit from the machine with their four principal sides having smooth, regular perpendicular surfaces. The spacing of the surfaces of the two drums in contact with the expanded phenolic resin mixture can thus display a difference of from 4 to 16 mm with that of the two side belts, this difference depending on the density and the thickness of the fabricated products.

These two drums are easy to replace for the purpose of creating the desired thickness of the products, in contrast to the side pieces of the apparatus according to U.S. Pat. No. 3,761,209.

The side belts bordering the path of free expansion upstream of the second or conforming surface and with a height which corresponds to the greatest thickness provided for the products, need not be altered at the time of a change of fabrication thickness.

The moving surface and the second surface 3 and 4 illustrated in FIG. 1 are comprised of unadhesive bands, particularly bands of rubber material with polytetrafluoroethylene surfaces. These endless belts are supported by the endless conveyors 1 and 2, likewise parallel, comprised of undeformable metallic strips under pressure. The endless conveyor 2 and the surface 4 are provided with means for spacing them more or less from the moving surface 3 and from the conveyor 1 both of which are fixed in position at the same time. However, as an economic objective, the length of the endless conveyor 1 can be reduced to that of the conveyor 2 and can support the moving surface 3 at its downstream portion before it is covered with the second surface by a series of rollers turning freely on their axes or any other means not illustrated.

The mixing gun 5 is equipped with means for activating a regular to-and-fro movement along the whole width of the belt. This gun and these means are movable in the direction the lower belt advances.

A distribution comb 6 is placed at a slight distance from the gun and is likewise movable above the moving surface.

The radius 8 of the forward drum guiding the second surface must be between 250 and 500 mm as was stated above.

Turning brushes 9 and 10 are intended to clear the moving and the second surfaces of particles of expandable phenolic resin mixture which can adhere to them. Their characteristics and their speed of rotation are chosen in such a way so as not to deteriorate the moving and second surfaces.

Heat means 11 are placed under the moving surface in the zone corresponding to the free air expansion. These means are controllable in intensity and movable in the direction that the belt advances. Likewise, heat means of controllable intensity 12 and 13 are placed respectively above and below the second and the moving surfaces in the zone corresponding to the final hardening zone.

Figure 2:
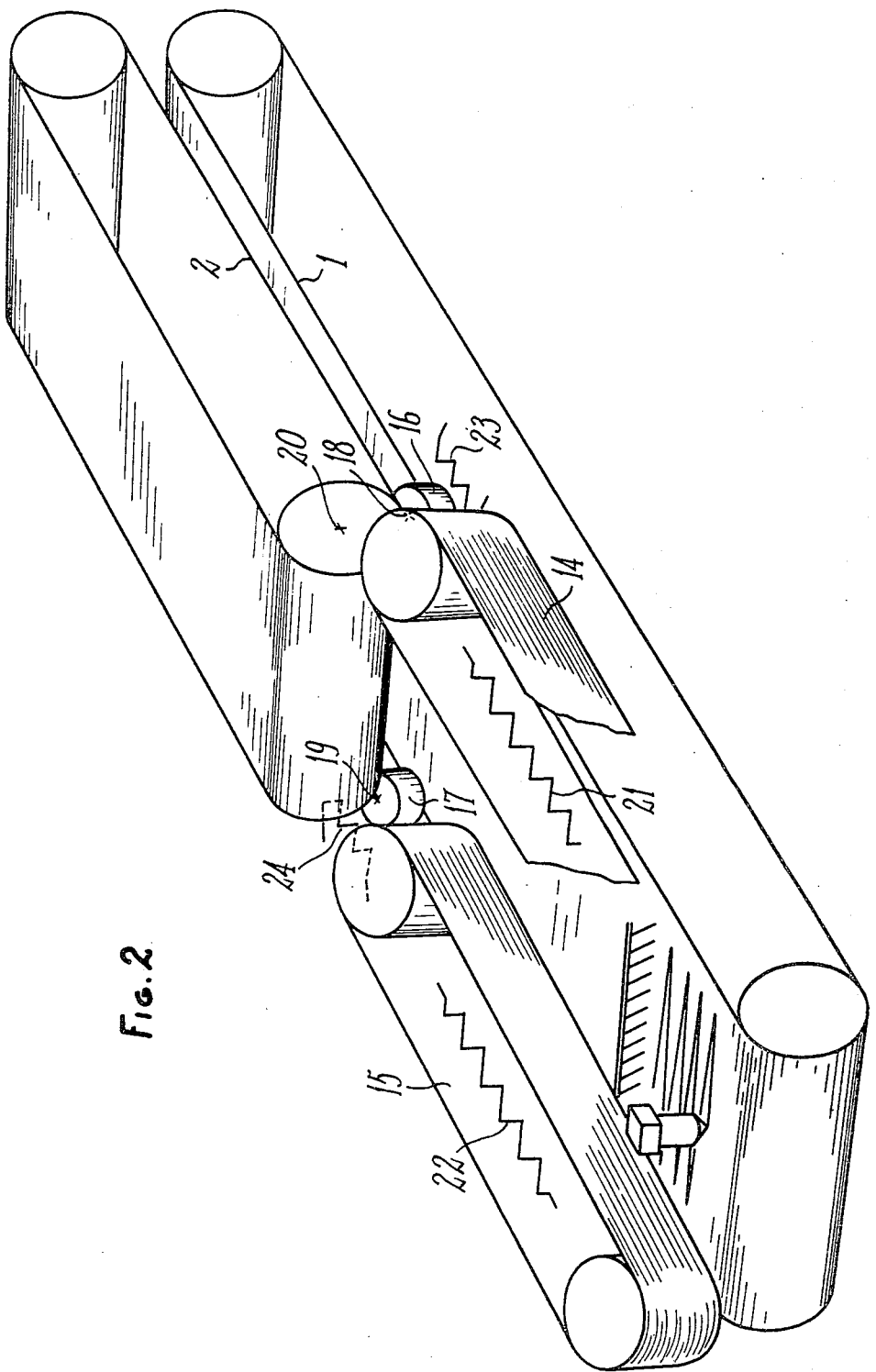
FIG. 2 illustrates a view in perspective of the apparatus.

FIG. 2 shows continuous side belts 14 and 15 with vertical surfaces and which are placed along the upstream portion of the conveyor 1, before its coverage with the conveyor 2. They are placed in such a manner that the lower edges of their sides in contact with the expandable liquid phenolic resin mixture are also in contact with the moving surface.

These side belts are comprised of rubber material like that of the moving surface and the second surface 3 and 4. Their speed is equal to that of the moving surface. The spacing of their sides in contact with the expandable liquid phenolic resin mixture determines the width of the blanket of expanded phenolic resin mixture. As regards the side belts 14 and 15, heat means 21 and 22 are provided which are designed to bring them to temperatures corresponding to those at various points in the zones of the conveyor 1.

Two steel rollers with polytetrafluoroethylene surfaces 16 and 17 (FIG. 2), of height equal to the fabrication thickness are placed at opposite sides of the conveyors 1 and 2 illustrated schematically in FIG. 2. Their vertical axes 18 and 19 are practically in the plane containing the horizontal axis 20 of the forward drum guiding the conveyor 2. These rollers 16 and 17 turn freely around their axes 18 and 19 and their lateral sides, which are in contact with the lateral sides of the expanded phenolic resin mixture, are slightly recessed in relation to the respective alignments of both of the surfaces of the side belts 14 and 15 in contact with the expandable phenolic resin mixture. Heat means 23 and 24 can be provided for maintaining these rollers at a temperature practically equal to that of the moving surface and the second surface adjoining this apparatus.

At the exit 7 of the machine the continuous sheet or panel of expanded and hardened phenolic resin mixture, which has acquired a good mechanical strength through hardening, can be dried after cutting into pieces. There is, therefore, a transversal sawing apparatus in this area, the saw moving at the same speed as the continuous panel, this apparatus being known. One may likewise provide other means for cutting the obtained panel.

The apparatus thus described as a whole can advantageously be provided with thermal insulation means, placed above the moving surface and at a distance above the maximum fabrication thickness. These means are useful for simplifying the control of all the parameters of fabrication in a workroom whose temperature can vary for example between summer and winter.

The invention will be described in more detail in the examples following:

EXAMPLE 1

Preparation of resin (FP 75 135 70)

In a reactor of 2000 liters provided with a double envelope for heating and cooling, as well as with a vigorous agitator, 720 kg of phenol and 778.5 kg of an aqueous solution of 35.8% by weight formaldehyde is introduced. This is heated to a temperature of 50° C. and 14.4 kg of an aqueous solution of 48.4% by weight sodium hydroxide is introduced little by little.

The temperature rises to 100° C. and is maintained at that level for 60 minutes. This mixture is cooled then to 80° C. and 130.5 kg of an aqueous solution of 35.8% by weight formaldehyde is added and, at the same time, 14.4 kg of an aqueous solution of 48.4% sodium hydroxide is added. The temperature of 80° C. is maintained for 30 minutes and then cooled to 32° C.

Then 67.9 kg of an aqueous solution of 18.65% by weight hydrochloric acid is added. The final pH is 3.5. The resin which is insoluble and denser than water separates from it and can be decanted. At the end of six hours this layer is taken out and 1105 kg of resin, having a dry extract of 71.9% is obtained.

EXAMPLE 1a

In a reactor 2000 liters identical to that of Example 1, 720 kg of phenol and 778.5 kg of an aqueous solution of 38.5% by weight formaldehyde is introduced. This is heated to a temperature of 50° C. and little by little 14.4 kg of an aqueous solution of 48.4% by weight sodium hydroxide is introduced. The temperature rises to 100° C. and is maintained at that level for 60 minutes. It is then cooled to 80° C. and 130.5 kg of an aqueous solution of 35.8% by weight formaldehyde is added, and at the same time, 14.4 kg of an aqueous solution of 48.8% by weight sodium hydroxide is added. The temperature is then maintained at 80° C. for 30 minutes, then cooled to 32° C.

The neutralization of the resin is then done by adding the necessary quantity of hydrochloric acid in order to obtain a pH of 7.3. The neutralized resin is left to settle for 6 hours, then the aqueous solution is separated from the resinous phase which represents around 75% of the total volume and which has a dry extract of 66.0%. This resin is gathered in an apparatus equipped for carrying out a distillation under reduced pressure. A portion of the water remaining in the resin is thus distilled at a temperature not in excess of 30° C. and a resin having a dry extract of 72.0% and a viscosity of 3000 cPo (centipoises) is obtained.

EXAMPLE 2

Preparation of an expandable liquid phenolic resin mixture from resin

With the help of a mixer, 100 parts in weight of the resins from Examples 1 and 1a are mixed with 1.5 parts of a water-soluble silicone oil L 5320 from Union Carbide and 5 parts of technical pentanes containing 25% by weight isopentane. This mixture is continuously carried by a feed regulating pump to the mixing gun by the apparatus of FIG. 1. By means of another feed regulating pump the same gun is fed with a mixture comprising 5.8 parts of an aqueous solution of 31% by weight hydrochloric acid and 1 part of methanol, the whole adding up to 100 parts of resin.

EXAMPLE 3

With the use of either of the two expandable liquid phenolic resin mixtures from Example 2, in which the proportion of technical pentanes varies between 3 and 6 parts per 100 parts by weight of resin, an apparatus of the type illustrated in FIGS. 1 and 2 is supplied with the expandable mixture while the different parameters of fabrication are controlled in order to obtain sheets or panels of expanded and hardened phenolic resin mixture of different densities and thicknesses, while using the characteristics of the methods according to the present invention. These panels, after their exit from the machine are dried at 115° C. for 20 hours in an air circulation chamber.

Samples of the same apparent density are cut from these panels with and without surface skins (samples cut with the saw at the center of the panels) and one proceeds with the measuring of the force required to rupture by bending according to the norm NF-T 56.102, of the maximum force required to puncture according to the norm NF-T 56.104, of the density according to the norm NF-T 56.107, and of the permeability to water vapor according to the norm NF-T 56.105.

The measurements of the mechanical properties are taken, the forces being applied normally to the upper side of the panels. The measurements of permeability to water vapor are done by penetration of water vapor across the upper side of the panels.

The results obtained are given in Table I on the next page. These results illustrate the substantial increase of the force required to rupture by bending and of the maximum force required to puncture because of the presence of a skin on the upper surface which is denser and harder in the panels of expanded and hardened phenolic resin mixture obtained according to the present invention. The results also show a decrease of the permeability to water vapor because of the presence of this upper surface skin.

It is likewise noted that there is a very substantial difference of resistance to abrasion between the surfaces coated with skin and those obtained by sawing the panels. It is noted that, in addition, the skins of the upper and lower sides of the panels are very smooth and homogeneous. The same results are obtained if the mixture of siloxane foam of L 5320 from Union Carbide is replaced by the Tween products 20 or G 1292 from Atlas Chemical.

TABLE I

| | EXAMPLE NO. | | | | | | | |
|---|---|---|---|---|---|---|---|---|
| | 1 | | 2 | | 3 | | 4 | |
| | WITH SKIN | W/OUT SKIN | WITH SKIN | W/OUT SKIN | WITH SKIN | W/OUT SKIN | WITH SKIN | W/OUT SKIN |
| Density in kg/m$^3$ | 30 | 30 | 40 | 40 | 45 | 45 | 50 | 50 |
| Force Required to Rupture by Bending in 10$^5$ Pa | 3.8 | 2.8 | 5.5 | 4.4 | 6.4 | 5.3 | 7.2 | 5.8 |
| Maximum Force Required to Puncture in 10$^5$ Pa | 2.7 | 2.3 | 3.8 | 3.5 | 4.4 | 3.7 | 5.0 | 3.9 |
| Permeability to Water Vapor in g/m$^2$/24h | 112 | 217 | 96 | 211 | 101 | 195 | 57 | 100 |

EXAMPLE 4

An apparatus such as illustrated in FIGS. 1 and 2 is used in which the total length of the lower conveyor 1 is 15.50 m and that of the upper conveyor 2 is 11.50 m. The distance between the two continuous side belts is 0.60 m. The height of these side belts is 0.30 m. The diameter of the forward drum of the upper belt is 0.80 m.

The mixing gun is fed with the premix of phenolic resin prepared according to French Pat. No. 75 135 70, with a blowing agent and with a cell structure agent from Example 2, and with the hardening catalyst of this same Example 2. The concentration of pentanes is 6% in weight with relation to the resin.

The following values are given to the parameters:
premix discharge from the gun: 400 g/mn
catalyst discharge from the gun: 26 g/mn
distance between the second surface and moving surface: 50 mm
speed of the second surface, the moving surface and the side belts: 32.5 cm/mn
distance between the gun and the start of the second surface: 3.67 m
length of the unheated zone of the moving surface: 0.67 m
length of the heated zone of the moving surface before the conformation zone of the second surface: 3 m
temperature at the start and at the end of this heated portion: 41° C. and 55° C. respectively
mean decrease of thickness of the expanded phenolic resin mixture by conformation: 2 mm Taking controls into account, the values below are obtained for the following parameters:
duration of the stickiness condition technically called "time of stickiness" (computed from discharge from the gun): 7 mn flow duration after the end of the stickiness condition at the time when the expanded phenolic resin mixture arrives in contact with the second surface: 4.3 mn The continuous sheet leaving the machine is cut and the resulting panels are dried 5 hours in an air circulation chamber whose temperature is controlled at 115° C.

With the same apparatus, an identical fabrication is carried out from the point of view of thickness, but the following parameters are varied, See Table II below:

TABLE II

| | | |
|---|---|---|
| Discharge of the premix from the gun | 850 g/mn; | 210 g/mn |
| Discharge of the catalyst from the gun | 55 g/mn; | 11.5 g/mn |
| Speed of the moving surface, the second surface and the side belts | 70 cm/mn; | 17.5 cm/mn |
| Temperatures at the start and at the end of the heated path of the moving surface | 45° C. & 60° C.; | 35° C. & 50° C. |
| Flow duration between the end of the stickiness condition and the start of the conformation of the thickness of the expanded phenolic resin mixture | 2 mn; | 8 mn |

The other parameters (the premix discharges and the catalyst discharges and the temperatures of the heated path of the moving surface are adjusted in these last two fabrications so as to maintain the thickness at 50 mm and the position of the point corresponding to the end of the stickiness condition, the distance between this point and the start of the second surface being practically equal to 1.40 m.

The continuous sheet of expanded and hardened phenolic resin mixture leaving the machine is cut and the resultant panels are dried as above.

It can be shown that, in the course of fabrication, for an interval of time of 2 minutes between the end of the stickiness condition and the start of conformation, the expanded phenolic resin mixture, as a consequence of a too weak hardening at the moment of the conformation, contracts, moving in on itself under the effect of the forward portion of the second surface. This phenomenon, known but not well explained, reveals itself by the presence of zones of partial tearing of the skin with irregularity of thickness of this skin on the outer surface of the upper side of the finished panels.

On the other hand, it can be shown that, for an interval of 8 minutes between the end of the stickiness condition and the start of conformation, the finished panels display residual waves on the outer surface as a consequence of too advanced hardening of the skin at the time of the conformation to thickness.

These inconveniences disappear completely when the interval between the end of the stickiness condition and the start of the conformation to thickness is 4.3 minutes.

It must be indicated finally that the respective lengths of 15.5 meters and 11.5 meters for the moving surface and the second surface are necessary only for a fabrication where the interval between the end of the stickiness condition and the start of the conformation is only two minutes. In the other two cases, respective lengths of 7.5 and 4 m are sufficient.

EXAMPLE 5

The fabrication of panels of expanded and hardened phenolic resin mixture is carried out with the apparatus and according to the method of the present invention.

The total length of the moving surface is 7.50 m, that of the second surface is 4 m. The distance between the side belts is 60 cm and the height of these side belts is 300 mm. The diameter of the forward drum of the second surface is 800 mm. The mixing gun is fed with the premix and the catalyst used in Example 4 and with the same respective discharges.

The various adjustments are indicated in Example 4 for the first fabrication. The distance between the gun and the forward edge of the second surface is changed that is, brought to 3.00 m instead of 3.67 m and the distribution comb as well as the unheated zone upstream of the heated path of the moving surface are done away with. Along this length of 3.00 m the moving surface is heated between 41° C. and 55° C. Under these conditions, the end of the stickiness condition takes place 5 minutes after the exit from the gun, but the duration of time passing between the end of the stickiness condition and the start of the conformation remains equal to 4 minutes 18 seconds as in Example 4 for the first fabrication.

This being done, it is found that, on the outer surface of the upper side of the sheet of expanded and hardened phenolic resin mixture leaving the machine, there is a periodic variation of the thickness of the skin. This periodic variation of thickness results in waves present on the outer surface of the upper side of the expanded phenolic resin mixture before conformation.

On the other hand, it can be shown that on the lower side of the panels there are funnel shaped depressions which come from the thickness of the panel. This phenomenon is due to the rapid vaporization of the pentanes in contact with the moving surface, heated to a temperature above the boiling point of pentanes, at the time when the hardening reaction of the mixture has not yet begun and when, as a consequence, the mixture is still very liquid.

This example shows the inconveniences which appear when the distribution of the expandable liquid phenolic resin mixture is done away with and the unheated zone in the upstream portion of the moving surface is also done away with.

EXAMPLE 6

One proceeds to the manufacture of expanded and hardened panels of phenolic resin mixture by means of the apparatus and according to the process indicated at Example 5, using the same adjustments, except that the distance between the gun and the anterior edge of the second surface is 3.67 m. The non-heated zone of the upstream part of the lower conveyor is restored as well as the distribution comb that is normally attached. On the other hand, the two polytetrafluoroethylene rollers placed laterally at the level of the anterior drum of the second surface are eliminated.

It can be shown that on the panels obtained in this manner there is a deformation of the lateral faces. This deformation gives to the straight vertical section of the panels the form of a trapezoid, of which the small base corresponds to the lower face of the panels. The difference in size of the panels thus obtained, for a thickness of 50 mm, is around 10 mm between the upper face and the lower face of the panels.

This example shows well the function of the polytetrafluoroethylene rollers that produce lateral panel faces that are smooth and perpendicular to the two other faces, lower and upper.

EXAMPLE 7

This example describes the manufacture of expanded and hardened panels of phenolic resin mixture that are very thick.

The apparatus and the process of the present invention are used, as well as the premix of Example 2 containing 6 parts by weight of pentane for 100 parts of resin. The catalyst is composed of 5.8 parts by weight of an aqueous solution of hydrochloric acid at 31% by weight and one part by weight of methanol, the whole adding up to 100 parts by weight of resin.

The length of the moving surface is 7.50 m, that of the second surface is 3.5 m and the diameter of the anterior drum of the second surface is 800 mm. The distance between the side belts is 600 mm (and that between the two rollers of polytetrafluoroethylene-coated steel is 592 mm). The height of the side belts is 300 mm, that of the rollers of polytetrafluoroethylene-coated steel is 300 mm, as well as the separation between the second surface and the moving surface.

The gun is fed with the premix at a flow of 1180 g/mn, and with the catalyst at a flow of 68 g/mn.

The following values are given to the parameters indicated below:
- speed of the moving surface and the side belts: 14 cm/mn
- respective temperatures of the beginning and end of the heated zone of the moving surface situated before the conformation: 25° C. and 40° C.
- temperatures of the conformation zone between the moving surface and the second surface: 45° C. to 70° C.

At the exit of the machine is obtained a continuous sheet of expanded and hardened phenolic resin mixture that is cut into panels 1200 mm in length. These panels are then dried in an air circulation oven for 7 hours at 115° C. and have an average density of 26.0 kg/m³ (including skin surfaces). The surfaces of the four faces of these panels corresponding to those of the sheet of expanded and hardened phenolic resin mixture are smooth and regular

EXAMPLE 8

One proceeds to the manufacture of panels of expanded and hardened phenolic resin mixture by means of the apparatus and according to the process of the present invention by using the expandable liquid phenolic resin mixture of Example 2. The adjustment of the various manufacturing parameters and the formulation of the premix and the catalyst fed into the gun are carried out to obtain products of expanded and hardened phenolic resin mixture of a density of between 32 and 38 kg/m³ after drying and removal of the surface skins.

Three panels cut from the same sheet are subjected to a drying for 20 hours in an air circulation oven. The temperature is successively controlled for each of the panels at the respective values of 100° C., 115° C. and 130° C.

Then these panels are cut into test pieces without surface skin on which is measured the density according to the NF-T 56.107 norm, the critical force required to compress according to the NF-T 56.101 norm, and the maximum force required to puncture according to the NF-T 56.104 norm.

The results indicated in Table III are obtained:

TABLE III

| Oven Temperature | 100° C. | 115° C. | 130° C. |
| --- | --- | --- | --- |
| Density in kg/m³ | 32.0 | 32.0 | 33.3 |
| Critical Force Required to Compress in $10^5$ Pa | 1.9 | 2.4 | 2.2 |
| Force Required to Rupture by Bending in $10^5$ Pa | 3.8 | 4.2 | 2.7 |
| Maximum Force Required to Puncture in $10^5$ Pa | 1.5 | 1.8 | 1.7 |

This example shows the influence of the oven temperature of the panels on the three mechanical properties indicated. It has been verified that the temperature of 115° C. is the most favorable.

EXAMPLE 9

This example shows a particular property of the skins of the principal faces of the expanded and hardened panels of phenolic resin mixture obtained according to the process of the present invention. It concerns the abrasion resistance of the surface skins.

The abrasion resistance measuring apparatus is composed of a metallic frame having an electric motor, driving, by means of pulleys and belts, a vertical shaft. This shaft is hollow with vertical slots, and drives a full shaft that is coaxial to it, and which carries at its lower end a horizontal disc rubberized on its lower face. The full shaft, carrying the rubberized disc, is driven by means of projecting parts fitted in the slots of the hollow shaft, but remains free in the vertical direction, in a way so that the rubberized disc, covered with an abrasive paper, rests on the upper horizontal face of a test piece of the expanded and hardened phenolic resin mixture placed in a parallel position beneath.

The total weight of the rubberized disc, the abrasive paper and the vertical shaft fixed to this disc, is 540 g. The diameter of the rubberized disc and the abrasive paper is 150 mm. and the speed of rotation is 1000 rpm. The abrasive paper is a corundum paper n° 000, grain n° 120 of the "Superabrax" mark designed for wood sandpapering.

The test pieces of the expanded and hardened phenolic resin mixture have a density of 32 kg/m³. They are cut into panels of 32 kg/m³ and dried at the 115° C. temperature of Example 9. They have a parallelepiped form of dimension, 250×250×50 mm and have at their center a cylindrical slot for which the axis is vertical and the diameter is 35 mm, on the largest face throughout the whole thickness.

These test pieces are placed, for measuring, with their largest faces arranged horizontally, parallel to the plane of the abrasive disc and the axis of their central slot coinciding with the axis of the disc and the shaft that drives it. By means of a chronometer one measures the time necessary for the abrasive disc to perforate the surface skin. The end of this operation is easily apparent, in the region of about 5 seconds, by the large difference in speeds of the disc to perforate the skin and the heart of the test-piece. One can measure equally the time necessary for perforating entirely a test-piece without surface skin, cut out of the heart of a thick panel of expanded and hardened phenolic resin mixture.

The following results are obtained:

|  | Time of perforation in seconds |
|---|---|
| Skin of upper face | 120 |
| Skin of lower face | 30 |
| Test piece without surface skin, 50 mm thickness | 35 |

It has been verified that there is a great abrasion resistance for the skin of the upper face, a much lower resistance for the skin of the lower face, and a very weak resistance for the heart of the expanded and hardened phenolic resin mixture.

The thickness of the denser layer referred to as the upper face skin is on the order of 1.5 mm and that of the lower face skin is around 0.7 mm. The test piece without skin measures 50 mm in thickness.

We claim.

1. Apparatus for the continuous manufacture of blankets or sheets of expanded phenolic resin having a hard skin on each face, comprising:

(a) a displaceable mixer gun;

(b) a moving surface set below the mixer gun and on which the mixer gun deposits the expandable phenolic resin mixture, which moving surface is divided into a first cold zone, a second zone that is heated and is downstream of the first cold zone, and a third zone that is heated and is downstream of the second zone;

(c) an upper movable surface which is placed in a substantially parallel position to the third zone of the moving surface and which has a length and width that are substantially equal to the third zone of the moving surface;

(d) heating means for heating the upper movable surface and the second and third zones of the moving surface;

(e) movable side belts placed on both sides of the lower surface along a length coinciding with the first and second zones of the moving surface and forming with the moving surface a tight contact with the expandable phenolic resin mixture; and (f) movable side rollers placed in alignment with the downstream end of the movable side belts and at the entrance of the third zone, which movable side rollers form with the moving surface and upper movable surface a tight contact with the expandable phenolic resin mixture.

2. Apparatus for the continuous manufacture of blankets or sheets of expanded phenolic resin having a hard skin on each face, comprising:

(a) a displaceable mixer gun;

(b) a moving continuous conveyor belt wound upon two drums and set below the mixer gun and on which the mixer gun deposits the expandable phenolic resin mixture, which moving belt is divided into a first cold zone, a second zone that is heated and is downstream of the first cold zone, and a third zone that is heated and is downstream of the second zone;

(c) an upper movable continuous conveyor belt wound upon two drums and placed in a substantially parallel position directly above the third zone of the moving belt and which has a length and width that are substantially equal to the third zone of the lower moving belt;

(d) heating means for heating the upper movable belt and the second and third zones of the lower moving belt;

(e) movable side belts placed on both sides of the lower moving belt along a length coinciding with the first and second zones of the lower moving belt and forming with the lower moving belt a tight contact with the expandable phenolic resin mixture; and (f) movable side rollers placed in alignment with the downstream end of the movable side belts and at the entrance of the third zone of the lower moving belt, which movable side rollers form with the lower moving belt and upper movable belt a tight contact with the expandable phenolic resin mixture.

3. Apparatus according to claim 2 in which the speed of the movable side belts and movable side rollers is equal to that of the lower moving surface and upper movable surface.

4. Apparatus according to claim 2 in which the movable side rollers freely turn and have a height equal to the separation between the lower moving belt and upper movable belt and which movable side rollers have axes that are disposed vertically in the plane containing the horizontal axis of the anterior drum of the upper movable belt, the faces of these movable side rollers being aligned on the surfaces of the movable side belts.

5. Apparatus according to claim 2 wherein displaceable distributing combs are placed adjacent to the lower moving belt at a location in the first cold zone that is downstream of the displaceable mixer gun.

6. Apparatus according to claim 2 wherein the distance between the lower moving belt and uper movable belt can be adjusted.

7. Apparatus according to claim 2 wherein the interior drum of the upper movable belt has a radius of between about 25 cm and 50 cm.

8. Apparatus according to claim 2 wherein the movable side rollers are made of steel coated with polytetrafluoroethylene.

9. Apparatus according to claim 2 wherein the movable side belts and movable side rollers have heating means.

10. Apparatus according to claim 2 in which the displaceable mixer gun is equipped with means for activating a regular to-and-fro movement along the whole width of the belt.

11. Apparatus according to claim 2 in which the first cold zone is equipped with means for maintaining the temperature of the expandable phenolic resin mixture at a temperature of less than 23° C.

12. Apparatus according to claim 3 in which the second zone is equipped with means of heating the expandable phenolic resin mixture to a maximum of 60° C.

13. Apparatus according to claim 2 in which the movable side rollers have a height which corresponds to the greatest thickness of the expanded phenolic resin.

14. Apparatus according to claim 2 which further includes turning brushes to clear the particles of expandable phenolic resin mixture adhering to the upper movable belt and lower moving belt.

15. Apparatus according to claim 2 in which the third zone is equipped with means of heating the expandable phenolic resin to a temperature of between about 50° C. and about 70° C.

16. Apparatus according to claim 13 in which the lower moving belt, upper movable belt, movable side belts and movable side rollers each have a nonadhesive surface in contact with the expandable phenolic resin mixture.

17. Apparatus according to claim 16 in which the nonadhesive surface is a band of rubber material with polytetrafluoroethylene surfaces.

18. Apparatus according to claim 2 in which heating means maintain at approximately the same temperature, the lower moving surface and adjoining portions of the movable side belts.

19. Apparatus according to claim 2 in which heating means maintain at approximately the same temperature, the movable side rollers and the adjoining portions of the lower moving belt and upper movable belt.

20. Apparatus according to claim 2 further including means for cutting the material into panels after the material has passed through the third zone.

21. Apparatus according to claim 20 in which the means for cutting is a transversal sawing apparatus.

22. Apparatus according to claim 20 further including a means for drying the resin material after that material has been cut into panels.

23. Apparatus according to claim 22 in which the drying means consists of a heating means capable of heating the panels of resin material to a temperature of between about 70° C. and about 150° C. during this further drying step.

24. Apparatus according to claim 22 in which the drying means consists of a heating means capable of heating the panels of resin material to a temperature of between about 110° C. and about 120° C. during this further drying step.

25. Apparatus according to claim 2 in which the distance between the side rollers is less than the distance between the side belts.

26. Apparatus according to claim 2 in which the distance between the side belts and side rollers is adjustable.

* * * * *

UNITED STATES PATENT AND TRADEMARK OFFICE
CERTIFICATE OF CORRECTION

PATENT NO. : 4,252,515

DATED : February 24, 1981

INVENTOR(S) : Jean P. Meunier, Marie P. Barthe, Serge Have and Bernard Frumen

It is certified that error appears in the above—identified patent and that said Letters Patent is hereby corrected as shown below:

Column 3, line 37, after "surface" insert --skin--

Column 5, line 22, "Tweens" should read --Tween--

Column 5, line 23, after "product" insert --from--

Column 5, line 24, "Altas" should read --Atlas--

Column 5, line 40, "transfersal" should read --transversal--

Column 6, line 35, second "of" should read --at--

Column 8, line 48, after "reactor" insert --of--

Column 8, line 50, "38.5%" should read --35.8%--

Column 8, line 57, "48.8%" should read --48.4%--

Column 10, line 64, after "Taking" insert --these--

Column 11, line 25, after "surface" insert a closed parenthesis --)--

Column 13, line 51, after "regular" insert a period --.--

Claim 6, line 2 (Column 16, line 37), "uper" should read --upper--

UNITED STATES PATENT AND TRADEMARK OFFICE
CERTIFICATE OF CORRECTION

PATENT NO. : 4,252,515

DATED : February 24, 1981

INVENTOR(S) : Jean P. Meunier, Marie P. Barthe, Serge Have and Bernard Frumen

It is certified that error appears in the above—identified patent and that said Letters Patent is hereby corrected as shown below:

Claim 16, line 1
(Column 17, line 3) "13" should read --2--

Signed and Sealed this

Tenth Day of August 1982

[SEAL]

Attest:

Attesting Officer

GERALD J. MOSSINGHOFF
*Commissioner of Patents and Trademarks*